Oct. 26, 1965 G. GATTRUGERI 3,214,312
METHOD AND APPARATUS FOR PRODUCING FLEXIBLE
BAGS HAVING TRANSVERSE BOTTOMS
Filed March 6, 1962 2 Sheets-Sheet 1
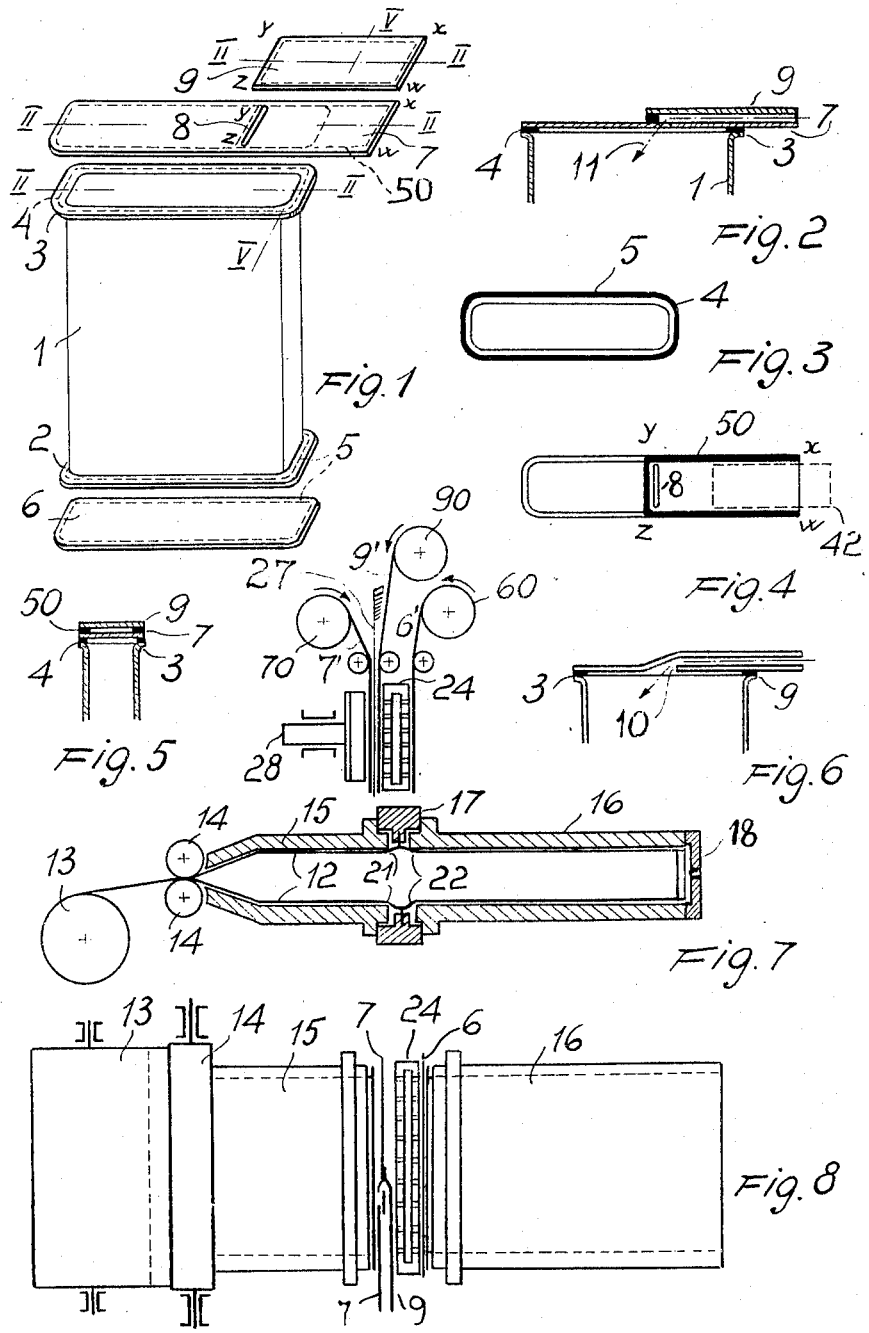
INVENTOR.
GIOVANNI GATTRUGERI
BY
ATTORNEY Oct. 26, 1965  G. GATTRUGERI  3,214,312
METHOD AND APPARATUS FOR PRODUCING FLEXIBLE
BAGS HAVING TRANSVERSE BOTTOMS
Filed March 6, 1962

INVENTOR.
GIOVANNI GATTRUGERI
BY
ATTORNEY

United States Patent Office 3,214,312
Patented Oct. 26, 1965

3,214,312
METHOD AND APPARATUS FOR PRODUCING FLEXIBLE BAGS HAVING TRANSVERSE BOTTOMS
Giovanni Gattrugeri, Milan, Italy, assignor, by mesne assignments, to Edison, Milan, Italy, a corporation of Italy
Filed Mar. 6, 1962, Ser. No. 177,883
Claims priority, application Italy, Mar. 8, 1961, 4,319/61, Patent 645,939
7 Claims. (Cl. 156—69)

The present invention relates to a bag made of flexible material and having transverse bottoms and to the method for the manufacture thereof, as well as to a new type of valve with which the bag may be provided.

Bags made of thermoplastic or similar flexible materials are formed from tubular or flat films of said materials and are shaped like the well known bags made of jute, canvas or cotton, i.e., they are obtained from a length of flattened tubular film which is closed by welding or sticking the superposed walls of the flattened tube together at one end thereof, whilst the other end can remain open in order to provide an open-mouth bag, or said mouth may also be closed so as to form a valve which allows material to be introduced into the bag but not to spill out accidentally therefrom. Bags formed from flat film are obtained in almost the same manner and are welded on at least three of their sides. All the aforesaid bags have the characteristic of being flat when empty, i.e., of having a shape which belongs rather to plane than to solid geometry. They do not have proper bottoms in that such bottoms do not in practice exist since they consist of the parts of the bag themselves, welded together at the ends, and when said bags are filled, they assume a roughly round shape which does not allow the full bag to stay in a vertical position and causes difficulty in obtaining stable stacking thereof. Furthermore, the distribution of the strains on the welds which close the bags is not uniform over the whole of their length, and can easily be broken at the points thereof subject to the greatest strains. In order to overcome these drawbacks, some bags are made with two side flaps which give the full sack a more stable square shape: in this manner, however, weak points are created in the welds at the places where the number of thicknesses of film welded together jumps from two to four, and in addition the weld becomes shorter and hence subject to greater unit strain, and, for the same capacity, a larger quantity of film must be used.

An object of the present invention is to overcome the aforesaid disadvantages by providing a bag of flexible or plastic material which, even when empty, has its own prismatic or cylindrical shape belonging to the realm of solid geometry.

Another object is to create a bag free from weak suture points and in which the forces acting on the envelope constituting the bag are evenly distributed without local concentrations of strains.

Another object of the invention is to create a strong, reliable bag, convenient to use and capable of being easily and rapidly manufactured with a saving in material employed, in such a manner as to shorten the time required to manufacture the bag and thus render it less costly.

Another object is to provide, in the course of manufacturing the bag, a special valve in one of the walls of the bag, said valve being such as not to weaken the walls of the bag while at the same time performing its own functions in an irreproachable manner and preventing the accidental leakage of the material contained in the bag.

Another main object is to provide a practical, fast, reliable and economical method for the manufacture of the bag.

These and other objects which will emerge from the following description are attained, according to the invention, by a bag of flexible material, characterized mainly in that it comprises, for its side wall, a tubular envelope and at least one transverse bottom fitted on at least one end of said tubular envelope, in which the peripheral edge of said transverse bottom fastened on the end portion of the tubular envelope and said end portion itself, are greater in perimeter than the mean perimeter of the tubular envelope.

The inventive process for making up bags with transverse bottoms, starting from flattened tubular film webs of flexible material, consists in inflating or swelling a length of tubular material at least twice the length of one of the bags to be made, by introducing air under pressure inside said length of tubular material and, at the same time, preventing said length of tubular material from expanding beyond a predetermined limit, except for an annular zone at which the tubular length is allowed to expand to a greater extent than the rest of the expanded length, circumferentially cutting the tube at said more expanded annular zone thereof, in order to enable the pressure acting in said annular zone to outwardly bend back the annular lips or rims of the more expanded circumferentially cut annular zone in the likeness of a flange, keeping said annular lips or rims thus bent back in the form of a flange, and welding the bottoms of the bags on to said outer flange lips.

Since the plastic or similar material normally used for the bags of the described type is expansible the formation of the flanged lips does not cause the bent edges of the tubular film to be torn.

The bag is thus obtained by expanding a length of tubular film (or film rendered tubular) so as to cause it to lose its flattened shape, and closing one (in the case of an open-mouth bag) or both the ends thereof with flat bottoms of flexible material and of a shape chosen at will (e.g., rectangular, square, round etc.).

The joint is made by welding or sticking the flat bottoms to the outwardly turned-back ends or edges or lips of the tube which is widened and so disposed as to assume a transverse section similar to that of the bottoms: the bag thus has the shape of a portion of tube of any cross-section, closed at one or both its ends by blank flanges. The bags can be open mouthed or can be provided on the sides or the bottoms with an adequate valve means or other closure or with the special valve which will be disclosed hereinafter and also forms an integral part of the present invention, although it is applicable to ordinary bags also.

Said valve is formed by piercing in the bag (or the side or any bottom it may have) a window or slit and covering it either outside or inside with a panel of flexible material of suitable size, which is welded or stuck to the bag along three sides of said panel so as to form a sort of "superposed pocket" applied on the outside or the inside of the bag, at the bottom whereof there is the window or slit pierced in the bag proper, and by so arranging the position and size of the panel of flexible film material as not to impede direct contact at any point between the applied bottom of the bag and the tube along the whole line of their welding or fixing, or, in the case of flat bags, so as not to impede at any point the direct contact of the opposite sides of the bag with each other along the lines of the weld which close and form the bag.

In practice, the process for manufacturing continuously bags such as those first described, fitted with the special valve aforesaid or with some type of closure, or with an open mouth, consists in passing the flattened tubular film (or film rendered tubular), which is unwound as a web from a spool, through two forming tubes arranged one after the other and facing each other by means of a suitably shaped annular frame having an internal transverse section equal to the desired transverse section of the bag, expanding the flattened tubular film by means of air inflated therein at the free end thereof so as to cause the film tube to adhere to the inside walls of the forming tubes and, in this position retaining the film tube by making an appropriate vacuum or depression between the outer wall of the tubular film and the inside walls of the forming tubes and of the annular frame gripped between them, in transversely cutting said tubular film (e.g., by means of a strip or wire, electrically heated at the desired moment, lodged in the annular frame gripped between the forming tubes and, like the annular frame, surrounding the tubular film, or by means of some other method) along a line co-planar with the annular frame and in such a manner that the free ends of the tubular film which are brought into being by said cut, are turned back, by the combined action of the air blown into the film tube and the aforesaid vacuum or depression, towards the outside, thus lining and adhering to the facing annular edges of the forming tubes, and remain held in this position by the depression aforesaid, removing the annular frame after having withdrawn the forming tubes pressed against it (or, if the case be, after contracting an adjustable thickness frame), introducing between the facing forming tubes a small flat plate carrying, held on one face (by means of an internal vacuum thereof or some such means), a panel of flat film designed to form one of the bottoms of a bag, and on the opposite face another panel of film designed to form the bottom of the next bag, it being possible for one or both of said bottoms to be previously partially or wholly shaped so as to form the special valve hereinbefore described or another conventional closure, in bringing the forming tubes closer together (or expanding the plate if same is expandable) so that it presses the flat films adhering to the opposite faces of the plate against the ends or annular lips of the tubular film which are turned back outwards and covering the facing annular edges of the forming tubes, and, at the same time, securing (e.g., by means of a high frequency electric welder having one pole connected to the plate and the other to the forming tubes, or by some other method) said panels of films to the tubular films so that one of them goes to form the second or the only bottom of the bag contained in the front forming tube and the other the first bottom of the succeeding bag, which has not yet been detached from the spool and is not yet completed, contained in the other forming tube, removing the plate after having withdrawn the forming tubes therefrom (or contracted the plate if same is expandable), putting the annular frame mentioned hereinabove back in its place, removing the vacuum causing the tubular films to adhere in the forming tubes, extracting the formed bag contained in the front forming tube, causing the tubular film web being unwound from the spool, having its end closed by the bottom with or without valve applied thereto in the previous welding operation to advance through the front forming tube for the length desired, and in blowing air inside the tubular film through the valve or opening existing in the bottom applied to its end, and thereafter starting a fresh cycle.

The forming tubes may be of any desired cross-section.

If it is desired to manufacture open-mouth bags, only the face of the plate facing the front forming tube will be used and the bottom will be applied only to the portion of tubular film contained therein, the end of the tubular film web connected to the spool being left without a bottom: the air will be blown in while at the same time temporarily constricting (even without welding) said end around the blowing tube.

The invention will now be explained more fully with reference to the accompanying schematic drawing, given solely to illustrate the invention without limiting the scope thereof, in which:

FIG. 1 shows a schematic side perspective view of the bag according to the invention in which the several parts composing the bag are shown detached one from the other for the sake of clarity, and in which, also for the sake of clarity, the thickness of the bag is shown out of proportion to the other dimensions thereof;

FIG. 2 shows a longitudinal section taken along the line II—II of FIG. 1, relating to the top part of the bag and with the component parts in their assembled position;

FIG. 3 is a plan view showing the welding line of one of the bottoms;

FIG. 4 shows a plan view of the welding line of the valve of the bag;

FIG. 5 shows a section taken along the line V—V of FIG. 1, relating to the top part of the bag, and with the component parts in their assembled position;

FIG. 6 shows a longitudinal section similar to that of FIG. 2, but relating to the top part of a conventional bag in order to show the weak points of such a bag;

FIG. 7 shows a schematic side view of the equipment for the manufacture of bags by continuous process, in which the apparatus for the insertion and application of the bag bottoms can also be seen;

FIG. 8 shows a schematic plan view of the equipment of FIG. 8, in which a device for welding the bottoms has been inserted;

Figure 9:
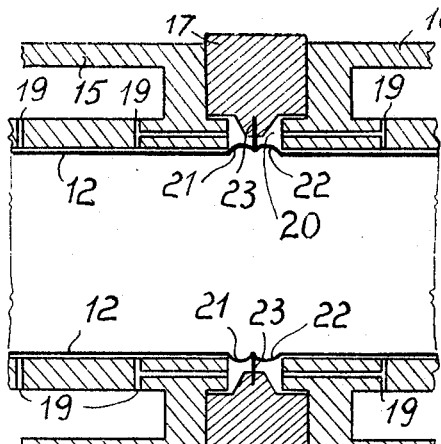
FIG. 9 and FIG. 10 show axial sections through members used for the formation of the outer annular flange-like rims of the tubular film from which the bag is made, respectively before and after the circumferential cut.

FIG. 1 shows, in an exploded view, a prismatic bag with a basically rectangular cross-section with rounded corners, fitted with the inventive valve applied to the upper bottom or end wall thereof. In the drawings, the numeral 1 indicates the portion of flexible tubular film making up the surface or side envelope of the bag, and having its end edges 2, 3 turned back outwardly so as to form flange-like rims or lips to which the bottoms or end walls 6 and 7, respectively, are fastened by means of welding along the annular broken lines 5 and 4 respectively (or by other means).

To the bottom or end wall 7 there is fitted the special valve described hereinabove, which is obtained by piercing therein a window 8 and covering same with a panel of flexible material 9, welded to the bottom or end wall 7 along U-shaped broken line $x, y, z, w$ appearing on FIG. 1. Both the bottom or end wall 7 and the panel 9 can, if required, project outwardly from the bag as shown in the drawing, so as to form a supplementary safety closure which can be sealed for security, in any preferred manner, after the material has been introduced.

In FIG. 1, panel 9 is shown applied to the outside of the bag and the sides $x, y$ and $w, z$ of the U-weld between said panel and the bottom 7 coincide, on overlapping, with part of the weld of bottom 7 to the tubular film 1, but if the safety closure is not required, panel 9 could even be applied from the inside by piercing window 8 in a position displaced towards side $x, w$ in such a manner, however, that it still looks towards the inside of the bag, and welding panel 9 to bottom 7 along the reversed U-line y, x, w, z, i.e. with the yz side open instead of the x, w side, and shortening the y, z side of the U so as to keep the x, y, w, z welds distinct from the welds between 7 and 1; with this arrangement, even in the case where valve 9 is applied internally, the result is obtained that bottom 7 and tubular film 1 are always in direct contact along the whole of the closed annular line of their fastening at the outer turned back flange edge 3, and the weak points which would occur if said direct contact were interrupted in some places by the interposition of panel 9, are avoided. FIG. 6 shows a conventional valve which does not avoid the above mentioned drawback and is fitted to the bottom of bag and at the numeral 10 there is shown the weak point mentioned hereinabove, which occurs when this type of valve is used.

Amongst other reasons, point 10 is weak because the weld jumps here from one wall to the other, thus forming a discontinuity in the weld at this point.

If desired, the inventive valve can be fitted to the tubular film instead of the bottom: it can therefore also be used on common flat bags and, when used on these, avoids the serious trouble due to the weak points which occur in the welds at the abrupt changes in thickness.

FIG. 2 shows the section on II—II of the top part, in assembled position of the bag of FIG. 1, and the broken line arrow 11 indicates the way by which the material is introduced.

FIG. 3 shows, in plan view, weld 4 between the turned back end 3 of the tubular film and the bottom 7, and also the weld 5 between 2 and 6.

FIG. 4 shows, in plan view, weld 50 between the bottom 7 and the panel 9; numeral 42 indicated a small sheet of material which cannot be welded to 7 and 9 and is introduced between them during the welding operation so that they do not weld together along side x, w; this sheet is, however, superfluous when 9 does not overlap the weld between 7 and 1.

FIGURES 7 and 8 show, in a schematic aggregate view, respectively in cross-section and plan, the continuous process for the manufacture of the bags first described; the flattened tubular film 12 unwinding from spool 13 is passed between the rollers 14 which have as their main function the retaining of the air blown into the tubular film as hereinafter disclosed and, if need be, of conveying tubular film, and is introduced into the inside of the forming tubes 15, 16 which clamp between them the annular frame 17. Air is blown in the tubular film 12 through the end 18 thereof so that the latter changes by inflation its flat form and comes into contact with the inner surface of the forming tubes 15, 16 with a disposition as indicated in FIG. 7. At this point (see FIG. 9 which shows, on an enlarged scale, the central part of FIG. 7) a vacuum is created, through pin-holes 19, between the outer surface of the tubular film 12 and the inner surface of the forming tubes 15, 16 and in the annular chamber 20, delimited by tubular film 12, annular frame 17 and the edges of the forming tubes.

On account of said vacuum and the pressure exerted by the air blown into the inside of the tubular film, said tubular film 12 will adhere strongly to the inner surface of the forming tubes 15, 16 and will be deformed in the zone of frame 17 as shown at 21, 22, thus pressing against the metal strip or wire 23 encircling the tubular film 12 and integral with frame 17.

Figure 10:
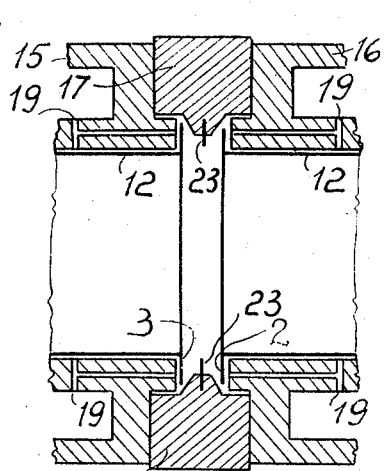
Figure 11:
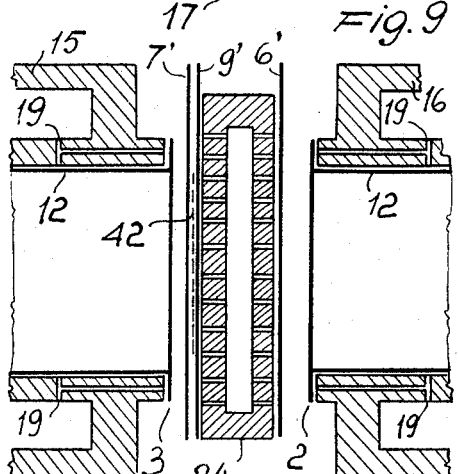
FIG. 11 is a view similar to that of FIGS. 9 and 10 in which a device for the application of the bottoms is seen in its operative position.
Figure 12:
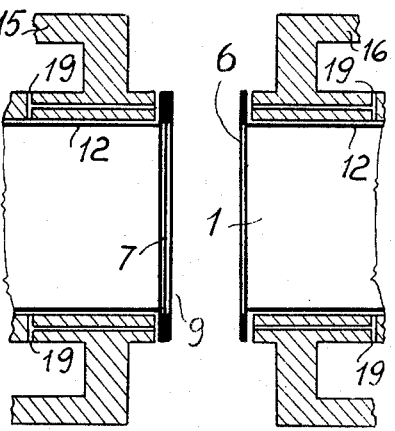
FIG. 12 is a view similar to that of FIG. 11, after the application of the bottoms and the withdrawal of the apparatus for the application of the bottoms.

At this point, strip 23 will be electrically heated and tubular film 12 will be cut circumferentially along the line of contact therewith and, at the same time, the pressure of the air contained in the tubular film combined with the vacuum created in the annular chamber 20, will thrust ends 21, 22 of the tubular film, which are separate from each other and free on account of the cut made, back towards the outside into a sort of flange arrangement adhering to the edges of forming tubes 15, 16 as shown in FIG. 10. Forming tubes 15, 16 are then withdrawn axially from frame 17, the air under pressure which, following the cutting of the tubular film, had filled annular chamber 20, will escape, but the two lengths of tubular film will keep their position and the shape they have assumed, and will line the inner and front surface of the forming tubes 15, 16 on account of the vacuum applied through pin-holes 19. Frame 17 will be removed (e.g. by lowering it). The removal of frame 17 will be automatically followed by the insertion (FIG. 11) of plate 24 on to one face of which flat film 6' adheres (e.g., by means of the vacuum created inside it) and will then become the bottom 6 of the bag contained in tube 16 (FIG. 12) and on to the other face of which (i.e. the one facing spool 13) there adheres (in the case of bags provided with the inventive valve first described) another flat film panel 7 on which previously a window will have been pierced and to which is welded along the line yz (FIG. 1) (or also along the U-line xyzw) the panel of film 9 covering it. Whenever necessary, as in the case of the valve with safety closure, the small sheet 42 hereinabove described is inserted in the position indicated in order to avoid 9 getting welded to bottom 7 along line xw also. Forming tubes 15, 16 are then tightened against plate 24 by pressing and, at the same time, fixing film 6 to end 2 of the tubular film contained in the front forming tube 16, to which other end (not shown) there had been fixed the bottom in the previous cycle of operations, and fixing at the same time film 7, which may be provided with a valve, to end 3 of the still uncut tubular film from the rest of the spool, contained in tube 15 and destined to become the bag which will be completed in the following cycle of operations as later explained. The fixing of the bottoms can be effected by means of electronic welding, plate 24 being connected to one pole of a high frequency generator and forming tubes 15, 16 to the other pole thereof, or by suitably heating the edges of the forming tubes and, if need be, plate 24, or by means of glueing, or by other suitable means. Plate 24, or the edges of the forming tubes, are formed with cutting edges, which are not shown, so that simultaneously with the fixing, any waste film can be cut off the bottoms. The forming tubes are then withdrawn, the vacuum which causes tubular film 6 to adhere thereto is annulled, and the completed bag contained in the front forming tube 16 is extracted. Plate 24 is then removed (e.g., by raising it), annular frame 17 being automatically put in its place, and through said annular frame the desired length of tubular film unwinding from spool, to the end of which bottom 7 with its valve is fixed, is passed. The forming tubes are again closed on frame 17 and the cycle is started again by blowing air into the tubular film through the valve or any other aperture existing in the end 7 thereof and executed during the above described cycle of operation.

It will be understood that the air for inflating the tubular film may be blown therein through a nozzle (not shown) provided at the end 18 of the forming tube 16.

When a new spool 13 is started, the first cycle of operations will have to be started by arranging the free end of the tubular film by hand in forming tube 15 (leaving 16 empty) and welding to it bottom 7 with its valve, or gripping the tubular film with suitable means around the air blowing nozzle and rejecting the first portion of tubular film.

It will be obvious that along the entire inner surface of the forming tubes 15, 16 sucking holes may be arranged and especially at the end 18 of tube 16 in order to avoid that the blowing air axially entrains the tubular film 12.

The system can be rendered multiple by placing after 16 other forming tubes separated from each other by as many pairs of annular frames 17 and plates 24, so as to obtain a plurality of bags for each advancement of the tubular film.

Figure 13:
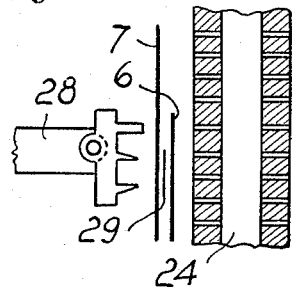
FIG. 13 shows schematically the means for welding the bottoms and for the application of the inventive valve, in a side view
Figure 14:
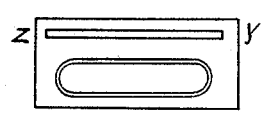
FIG. 14 shows a schematic front view of the cutting and welding edges of the device for the application of the valve and the bottoms.

In the top part of FIG. 7 there is shown a method for rendering the taking of bottoms 6, 7 to be applied to the bags by plate 24, automatic, and for the pre-fabrication of the valve on bottom 7. Above the forming tubes 15, 16 there are suspended, on one side of plate 24, spool 60 on which the flat film 6' used for forming the bottoms 6 is wound, and on the other side, spools 70, 90 for flat films 7', 9' respectively of suitable width according as it is desired to have valves of smaller or greater length and with or without safety closures) designed for the formation of bottoms 7 and the valves 9 thereof. The films unwinding from spools 70, 90 are separated by a lamina (which may, for example, be metallic) 27 coated with material which will not weld to the films, suspended between said films 7', 9' and of length proportional to the width of the window or cut 8 which it is desired to make in bottom 7. The numeral 28 indicates a welding electrode which, in the case of the figure, can move horizontally and independently of plate 24 and is adapted to make the successive windows 8 in the film unwinding from spool 70 and to cover same by welding thereover film 9 along the successive weld lines yz of FIG. 1; electrode 28 can, for example, have the shape indicated in FIGS. 13 and 14.

The process of pre-fabrication can be joined up with the operations hereinbelow disclosed, all of which take place when the plate 24 is extracted from the forming tubes (15, 16). Inside plate 24, the opposed surfaces whereof are pierced with holes; a vacuum is created in order to cause the hanging ends of films 7', 9', 6' to adhere thereto, electrode 28 is pressed against plate 24 so that film 7 is welded to film 9 along the length corresponding to length yz of FIG. 1, and at the same time pierces windows or slits 8 on film 7 only, in the zone adjacent to the weld. This can, for example, be brought about by arranging for films 7', 9' not to be in contact with each other in the zone lying below the cutting part of the electrode which pierces window 8, due to lamina 27 which must be sufficiently tough to prevent cut 8 from involving film 9' also. Alternatively, weld yz can be effected with an electrode pressing the two films on to plate 24, and the window with another electrode preceding the first, in the sense of the unwinding of the films, and pressing film 7' only against another, fixed, plate inserted between films 7' and 9', this plate also preceding plate 24 in the sense of the unwinding of the films, or by other suitable means.

When the weld has been made, electrode 28 (or the electrodes) return to their original position, and when frame 17 is removed, plate 24 can follow it automatically and take its place, entraining with it, on account of the vacuum which causes them to adhere to it, films 7', 9', 6' unwinding from the spools. Once the bottoms have been welded to the tubular films contained in forming tubes 15, 16 and, at the same time, cut away from the spools, the vacuum inside plate 24 is annulled so that said plate, on rising again and yielding its place to frame 17, can reassume its original position between the free ends of films 7', 9' and 6' which the frame itself, during its previous descent, had caused to advance, and be ready to start the next cycle.

The suction and blowing sources have not been shown in the drawings, but may be of any known kind. Also the various channels and connections, pipes and systems have not been shown everywhere, but it will be understood that these pipes and connections may be arranged in any known manner.

I claim:
1. A method for obtaining bags with transverse bottoms starting from tubular webs of flexible material, which comprises,
    inflating a portion of the tubular web of a length corresponding to at least double the length of the bag to be obtained,
    preventing said portion of the tubular web from expanding beyond a predetermined limit with the exception of an annular zone at which the tubular portion is allowed to expand to a greater extent than at the rest of the inflated tubular portion,
    circumferentially cutting said tubular portion at such annular more expanded zone,
    outwardly bending the annular rims resulting from the circumferential cut until said annular rims assume a flange-like form,
    maintaining said rims in such flange-like form,
    and welding bottoms of the bag on said rims.
2. A method according to claim 1, wherein said tubular portion is inflated by introducing air under pressure therein.
3. A method according to claim 1, wherein around said annular more expanded zone a suction is applied.
4. A method according to claim 1, wherein the rims are maintained in said flange-like form by applying suction thereto.
5. A method according to claim 1, wherein said tubular portion is maintained in position by externally applying suction thereto.
6. A method according to claim 1, wherein, after the circumferential cutting of said tubular portion, the divided lengths of the tubular portion are spaced apart one from the other and at least one bottom panel for the bag is inserted between the two divided lengths of said tubular portion.
7. An apparatus for manufacturing bags of flexible material, comprising a first sleeve member, a second sleeve member aligned with respect to said first sleeve member and axially spaced from the latter to define an annular gap between said first and second sleeve members, means for feeding flexible tubular material within said sleeve members, means for inflating said tubular material within said sleeve members, suction applying means in said sleeve members to maintain said tubular material in position within said sleeve members, cutting means disposable in said annular gap to circumferentially cut the inflated tubular material, means for intermittently feeding panels of flexible material within said annular gap, and welding means for welding said panels on the circumferentially cut edges of said tubular material.

References Cited by the Examiner

UNITED STATES PATENTS

| | | | |
|---|---|---|---|
| 2,660,100 | 11/53 | Doyle | 93—35 |
| 2,946,502 | 7/60 | Metzger | 229—62.5 |
| 2,955,517 | 10/60 | Honsel | 93—35 |
| 3,003,682 | 10/61 | Mattson | 229—62.5 |
| 3,051,605 | 8/62 | Stannard | 156—196 |

ALEXANDER WYMAN, *Primary Examiner.*

GEORGE O. RALSTON, HAROLD ANSHER,
*Examiners.*